US007961792B2

(12) United States Patent
Maertens et al.

(10) Patent No.: US 7,961,792 B2
(45) Date of Patent: Jun. 14, 2011

(54) ROBUST SYSTEM FOR MAINTAINING AUDIO/VIDEO SYNCHRONIZATION DURING PLAYBACK OF MULTIMEDIA STREAMS WITH NO EMBEDDED TIME STAMPS

(75) Inventors: Gregory R. Maertens, Milan (IT); Kourosh Soroushian, San Jose, CA (US); Davide Concion, San Jose, CA (US)

(73) Assignee: LSI Corporation, Milpitas, CA (US)

( * ) Notice: Subject to any disclaimer, the term of this patent is extended or adjusted under 35 U.S.C. 154(b) by 1429 days.

(21) Appl. No.: 11/435,214

(22) Filed: May 16, 2006

(65) Prior Publication Data

US 2007/0268404 A1 Nov. 22, 2007

(51) Int. Cl.
*H04N 7/12* (2006.01)
*H04N 9/475* (2006.01)
(52) U.S. Cl. .................................. 375/240.26; 348/512
(58) Field of Classification Search ............. 375/240.26; 348/512
See application file for complete search history.

(56) References Cited

U.S. PATENT DOCUMENTS 6,452,974 B1 * 9/2002 Menon et al. ............ 375/240.28
2003/0128294 A1 * 7/2003 Lundblad et al. ............. 348/515
* cited by examiner

*Primary Examiner* — Young Lee
*Assistant Examiner* — Richard Torrente
(74) *Attorney, Agent, or Firm* — Christopher P. Maiorana, PC

(57) ABSTRACT

An apparatus having a first circuit, a second circuit and a third circuit. The first circuit may be configured to (i) demultiplex a multimedia stream having one or more video and audio streams and (ii) generate one or more video signals and one or more audio data signals in response to demultiplexing the multimedia stream. The multimedia stream may be independent of embedded time stamps. The second circuit may be configured to (i) decode the one or more video data signals and the one or more audio data signals and (ii) generate a video current time signal for each decoded video signal and an audio current time signal for each decoded audio signal. The third circuit may be configured to synchronize the playback of each decoded audio signal and each decoded video signal with the video current time signal and the audio current time signal.

18 Claims, 5 Drawing Sheets

ROBUST SYSTEM FOR MAINTAINING AUDIO/VIDEO SYNCHRONIZATION DURING PLAYBACK OF MULTIMEDIA STREAMS WITH NO EMBEDDED TIME STAMPS

FIELD OF THE INVENTION

The present invention relates to video processing generally and, more particularly, to a robust method and/or apparatus for maintaining audio/video synchronization during playback of multimedia streams that do not have embedded time stamps.

BACKGROUND OF THE INVENTION

One of the most important aspects in presenting a multimedia stream composed of a video and audio stream is the perception of synchronization between displayed video frames and corresponding audio information. A lag of more than one-quarter to one-half of a second between the audio and video information generally leads to perception problems by trained observers. Any lag beyond one-quarter to one-half of a second becomes distracting to ordinary observers. Typically, the maintenance of synchronization between audio and video forms the cornerstone of any multimedia decoder.

Conventional approaches include many different mechanisms for maintaining audio-video synchronization during a multimedia presentation. One common approach is to periodically embed the values of a reference clock in the stream, or to provide snapshots of such a clock for the corresponding audio and video streams. The ability to recover the master clock during the decode phase will help ensure the correct overall rate of presentation. Embedded time-stamps for audio and video streams also help ensure proper synchronization during playback between the audio and video streams.

In recent years, there has been a rise in popularity of an entirely different class of multimedia streams. Such multimedia streams are void of embedded timestamps. These multimedia streams primarily rely on consistent interleaving of the audio and video data for synchronization. Such streams are created on a personal computer, which avoids the need for any central-clock recovery mechanism. In addition, an inherent assumption at the distribution of a perfect stream with perfect synchronization between the audio and video streams avoids the need for any embedded time-stamps while relying on the physical relationship of the audio and video packets. The popularity of these streams has lead to expanding such implementations into the consumer electronic world. However, the consumer electronic world demands perfection in synchronization for signals without embedded time-stamps is now a challenge.

It would be desirable to provide a method and/or apparatus for maintaining audio-video synchronization during the playback of multi-media streams that do not contain embedded time-stamps.

SUMMARY OF THE INVENTION

The present invention concerns an apparatus comprising a first circuit, a second circuit and a third circuit. The first circuit may be configured to (i) demultiplex a multimedia stream having one or more video and audio streams and (ii) generate one or more video data signals and one or more audio data signals in response to demultiplexing the multimedia stream. The multimedia stream may be independent of embedded time stamps. The second circuit may be configured to (i) decode the one or more video data signals and the one or more audio data signals and (ii) generate a video current time signal for each decoded video signal and an audio current time signal for each decoded audio signal. The third circuit may be configured to synchronize the playback of each decoded audio signal and each decoded video signal with the video current time signal and the audio current time signal.

The objects, features and advantages of the present invention include providing a method and/or apparatus for maintaining audio/video synchronization during playback of multimedia streams that do not have embedded time stamps that may (i) allow for audio-video synchronization with sufficient accuracy for the consumer electronic world, (ii) be inexpensive to implement and/or (iii) be easy to implement.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
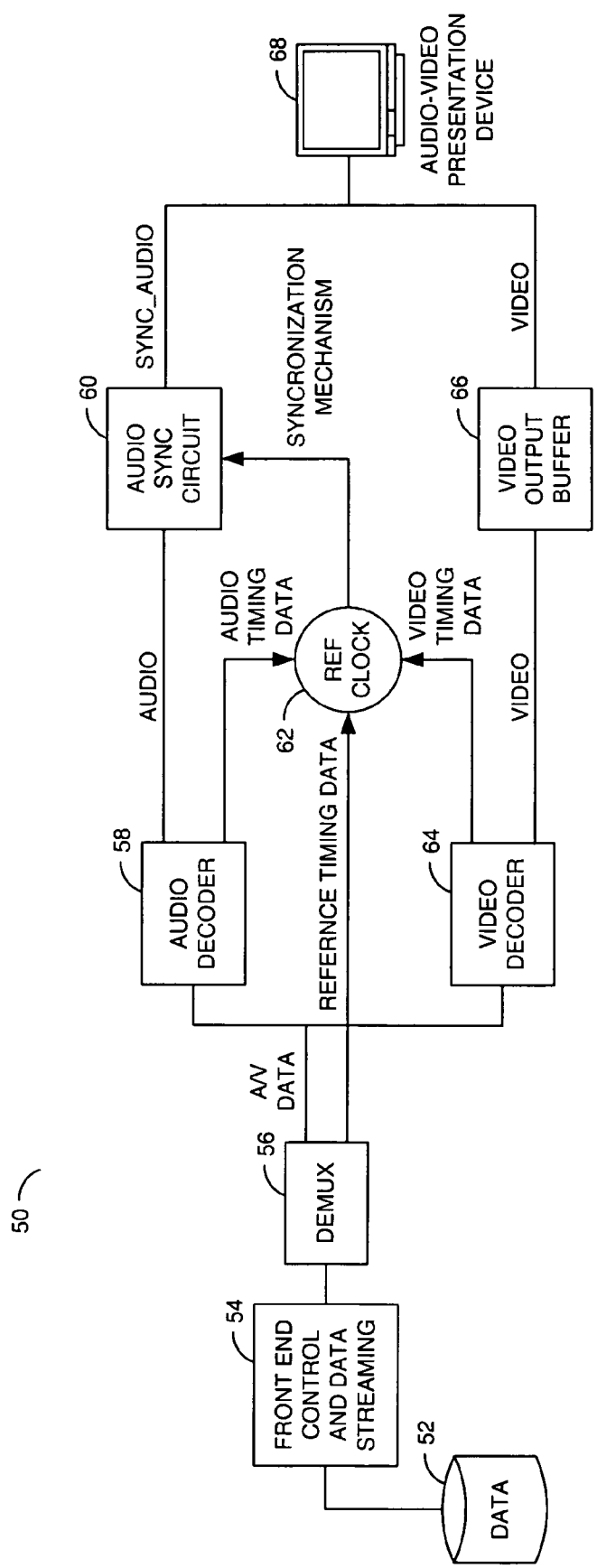
FIG. 1 is a diagram of an audio-video decoding unit.

Referring to FIG. 1, a block diagram of an audio-video decoding unit 50 is shown. The decoding unit 50 generally comprises a block (or circuit) 54, a block (or circuit) 56, a block (or circuit) 58, a block (or circuit) 60, a block (or circuit) 62, a block (or circuit) 64, a block (or circuit) 66, and a block (or circuit) 68. The circuit 54 may be implemented as a front end control and data streaming circuit 54. The circuit 56 may be implemented as a demultiplexer. The circuit 58 may be implemented as an audio decoder 58. The circuit 60 may be implemented as an audio synchronization circuit. The circuit 62 may be implemented as a reference clock. The circuit 64 may be implemented as a video decoder 64. The circuit 66 may be implemented as a video output buffer 66. The circuit 68 may be implemented as an audio-video presentation device.

The front end control circuit 54 may receive video/audio data 52 from a multiplexer (not shown). The front end control circuit 54 may present the video/audio data 52 to the demultiplexer 56. The demultiplexer 56 may present demultiplexed audio data on a signal (e.g., A/V DATA) to the audio decoder 58. The demultiplexer 56 may present demultiplexed video data on the signal A/V DATA to the video decoder 64. The demultiplexer 56 may present a signal (e.g., REFERENCE_TIMING_DATA) to the reference clock 62. The audio decoder 58 may present decoded audio data on a signal (e.g., AUDIO) to the audio synchronization circuit 60. The audio decoder 58 may also present a signal (e.g., AUDIO_TIMING_DATA) to the reference clock 62. The video decoder 64 may present a signal (e.g., VIDEO_TIMING_DATA) to the reference clock 62. The video decoder 64 may present decoded video data on a signal (e.g., VIDEO) to the video output buffer 66. The reference clock 62 may present a signal (e.g., SYNCHRONIZATION_MECHANISM) to the audio synchronization circuit 60. The video output buffer 66 may present the signal VIDEO to the audio-video presentation device 68. The audio synchronization circuit 60 may present a signal (e.g., SYNC_AUDIO) to the audio-video presentation device 68.

The front end control circuit 54 may perform analog processing, channel decoding and error correction on the video/audio data 52. The video/audio data 52 (or multimedia stream) may comprise video streams, audio streams and audio/video timing information (or embedded audio/video time stamps) related to a central clock. The multimedia stream 52 may be a multiplexed A/V file. The demultiplexer 56 may demultiplex the audio and video streams from the multimedia stream 52. The decoding unit 50 may maintain audio-video synchronization by extracting the embedded video/audio time stamps related to the central clock over the signal REFERENCE_TIMING_DATA. The demultiplexer 52 may extract the video and/or audio timing information from a central clock which is transmitted in the multiplexed A/V file. The audio decoder 58 may decode the demultiplexed audio data over the signal A/V DATA. The video decoder 64 may decode the demultiplexed video data over the signal A/V DATA. The audio decoder 58 may present (i) decoded audio data on the signal AUDIO to the audio sync circuit 60 and (ii) audio timing data on the signal AUDIO_TIMING_DATA to the reference clock 62. The video decoder 64 may present (i) decoded video data on the signal VIDEO to the video output buffer 66 and (ii) video timing data on the signal VIDEO_TIMING_DATA to the reference clock 62. The reference clock 62 may compare the video timing data and the audio timing data against the embedded video/audio time stamps extracted from the A/V multiplex file. In response, the reference clock 62 may control the audio synchronization circuit 60 to adjust the timing of the decoded audio data to correspond to the timing of the decoded video data with the signal SYNCHRONIZATION MECHANISM. The audio-video presentation device 68 may present audio data which is synchronized with the video data. In general, the video timing data and the audio timing data may be present as distinct entities in the multiplex file of the multimedia stream 52. The video timing data and the audio timing data may be derived from the video decoder 58 and the audio decoders 64.

Figure 2:
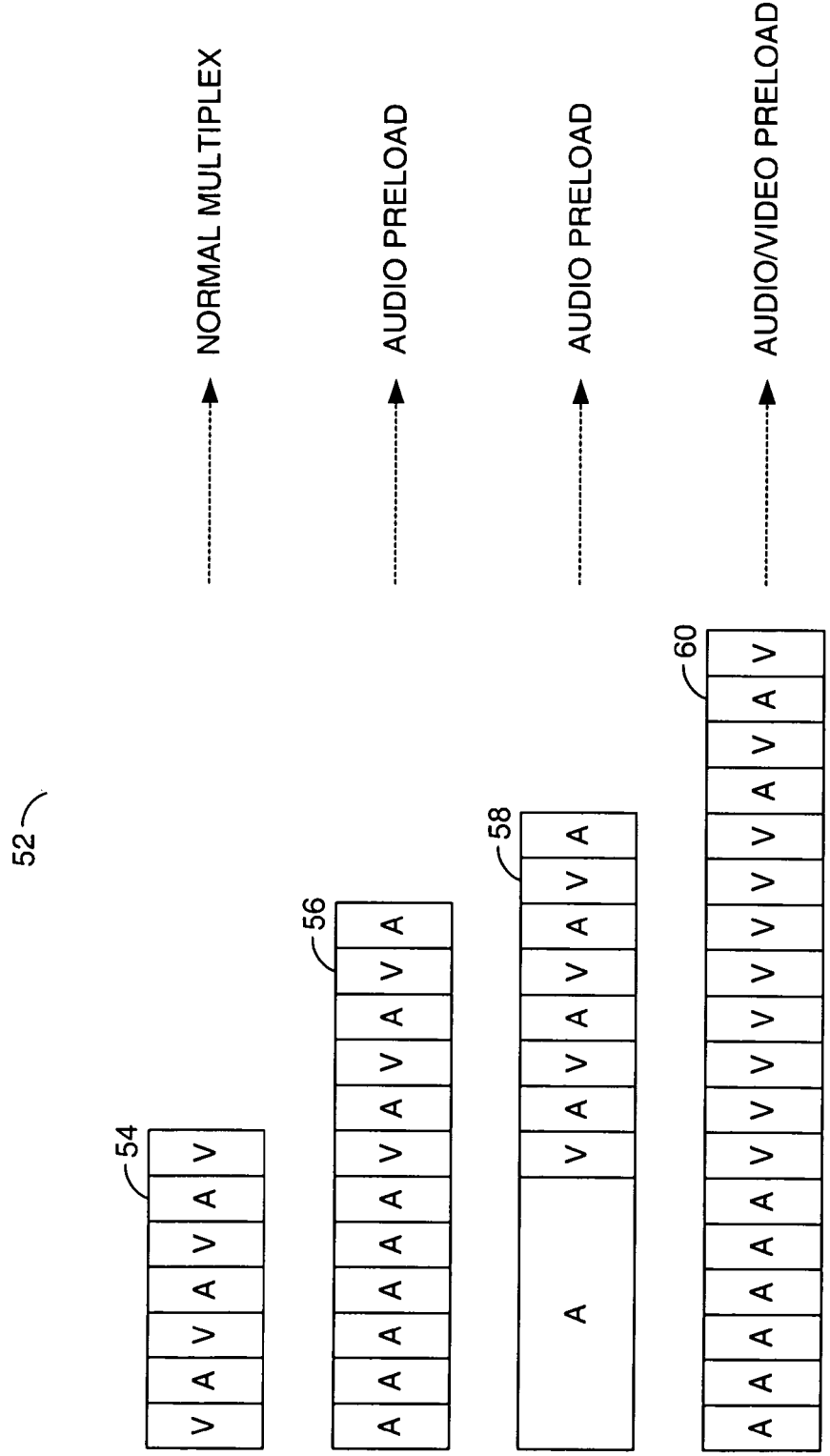
FIG. 2 is a diagram illustrating the relationship between audio and video packets in a data stream.

Referring to FIG. 2, a diagram illustrating the relationship between audio and video packets for a number of multimedia streams is shown. The multimedia stream 52 may be implemented as a normal multiplex stream 54, an audio preload stream 56, an audio preload stream 58, and/or an audio/video preload stream 60. Each stream 54, 56, 58 and 60 generally comprises audio and video packets. The normal stream 52 comprises an alternating sequence of multiplexed video and audio packets. The audio preload stream 56 comprises a number of multiplexed audio packets followed by an alternating sequence of multiplexed audio and video packets. The audio preload stream 58 comprises a single multiplexed audio packet followed by an alternating sequence of multiplexed video and audio data packets. The single multiplexed audio data packet may include a timing that is equivalent to a number of audio packets. The streams shown in FIG. 2 are a subset of all possible configurations of audio/video packets at the beginning of a stream, which depends on the particular multiplexer implementation. For example, stream 58 could be considered more optimized than stream 56 because of the smaller packetization overhead at the beginning of the stream. The audio/video preload stream 60 comprises a number of multiplexed audio packets followed by a number of multiplexed video packets and an alternating sequence of multiplexed video and audio packets. The particular arrangement and timing of the video and audio packets in the multimedia stream 52 may be varied to meet the design criteria of a particular implementation.

Figure 3:
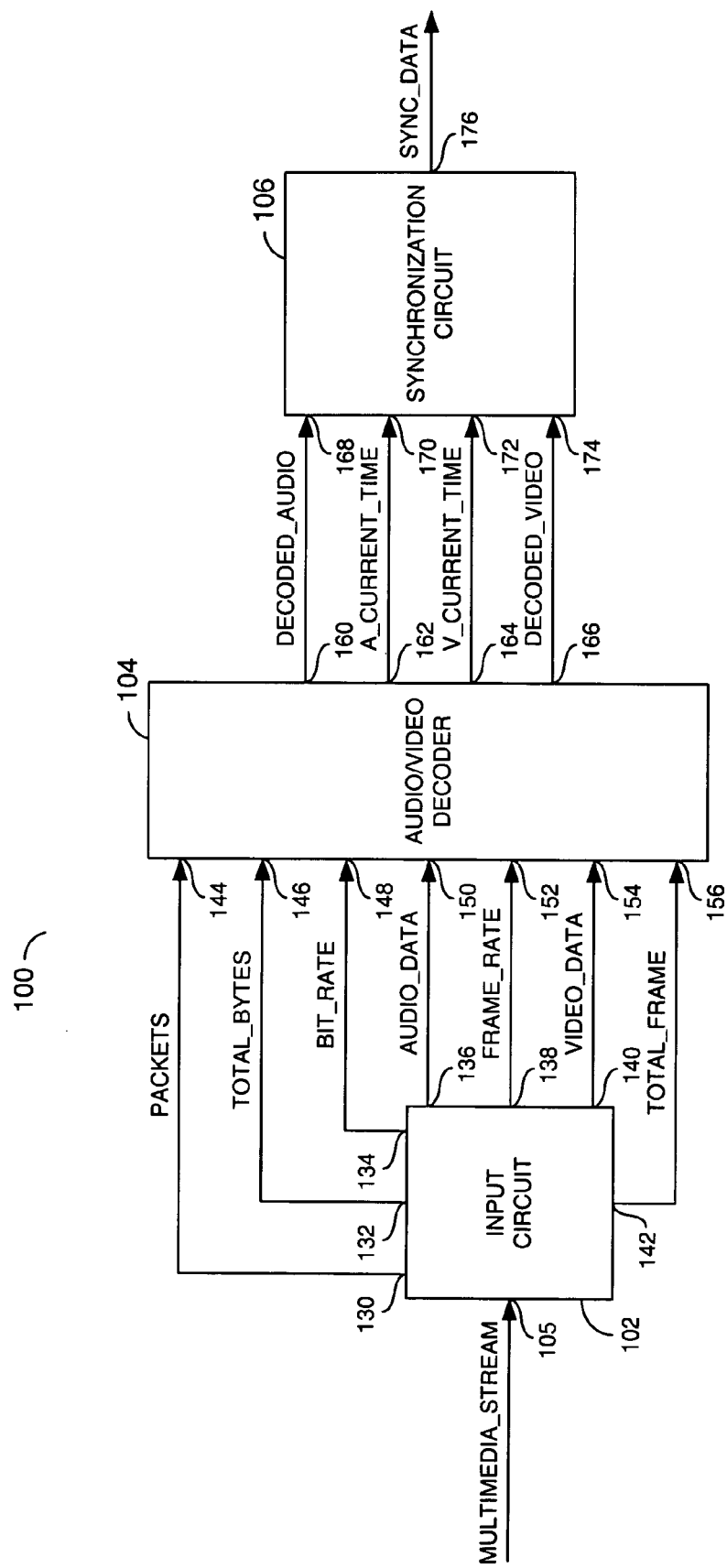
FIG. 3 is a block diagram of the present invention.

Referring to FIG. 3, a block diagram of a system 100 is shown in accordance with a preferred embodiment of the present invention. The system 100 generally comprises a block (or circuit) 102, a block (or circuit) 104 and a block (or circuit) 106. The circuit 102 may be implemented as an input circuit. The circuit 104 may be implemented as an audio/video decoder. The circuit 106 may be implemented as a synchronization circuit. The input circuit 102 may have an input 105 that may receive a signal (e.g., MULTIMEDIA_STREAM). The input circuit 102 may have an output 130 that may present a signal (e.g., PACKETS), an output 132 that may present a signal (e.g., TOTAL_PACKETS), an output 134 that may present a signal (e.g., BIT_RATE), an output 136 that may present a signal (e.g., AUDIO_DATA), an output 138 that may present a signal (e.g., FRAME_RATE), an output 140 that may present a signal (e.g., VIDEO_DATA), and an output 142 that may present a signal (e.g., TOTAL_FRAME). The audio/video decoder 104 may have an input 144 that may receive the signal PACKETS, an input 146 that may receive the signal TOTAL_BYTES, an input 148 that may receive the signal BIT_RATE, an input 150 that may receive the signal AUDIO_DATA, an input 152 that may receive the signal FRAME_RATE, an input 154 that may receive the signal VIDEO_DATA and an input 156 that may receive the signal TOTAL_FRAME. The audio/video decoder 104 may have an output 160 that may present a signal (e.g., DECODED_AUDIO), an output 162 that may present a signal (e.g., A_CURRENT_TIME), an output 164 that may present a signal (e.g., V_CURRENT_TIME) and an output 166 that may present a signal (e.g., DECODED_VIDEO). The synchronization circuit 106 may have an input 168 that may receive the signal DECODED_AUDIO, an input 170 that may receive the signal A_CURRENT_TIME, an input 172 that may receive the signal V_CURRENT_TIME and an input 174 that may receive the signal DECODED_VIDEO. The synchronization circuit 106 may have an output 176 that may present a signal (e.g., SYNC_DATA).

The system 100 may play back the decoded audio data and the decoded video data on the signal SYNC_DATA while maintaining audio-video synchronization without relying on embedded audio/video timestamps on the signal MULTIMEDIA_STREAM.

Figure 4:
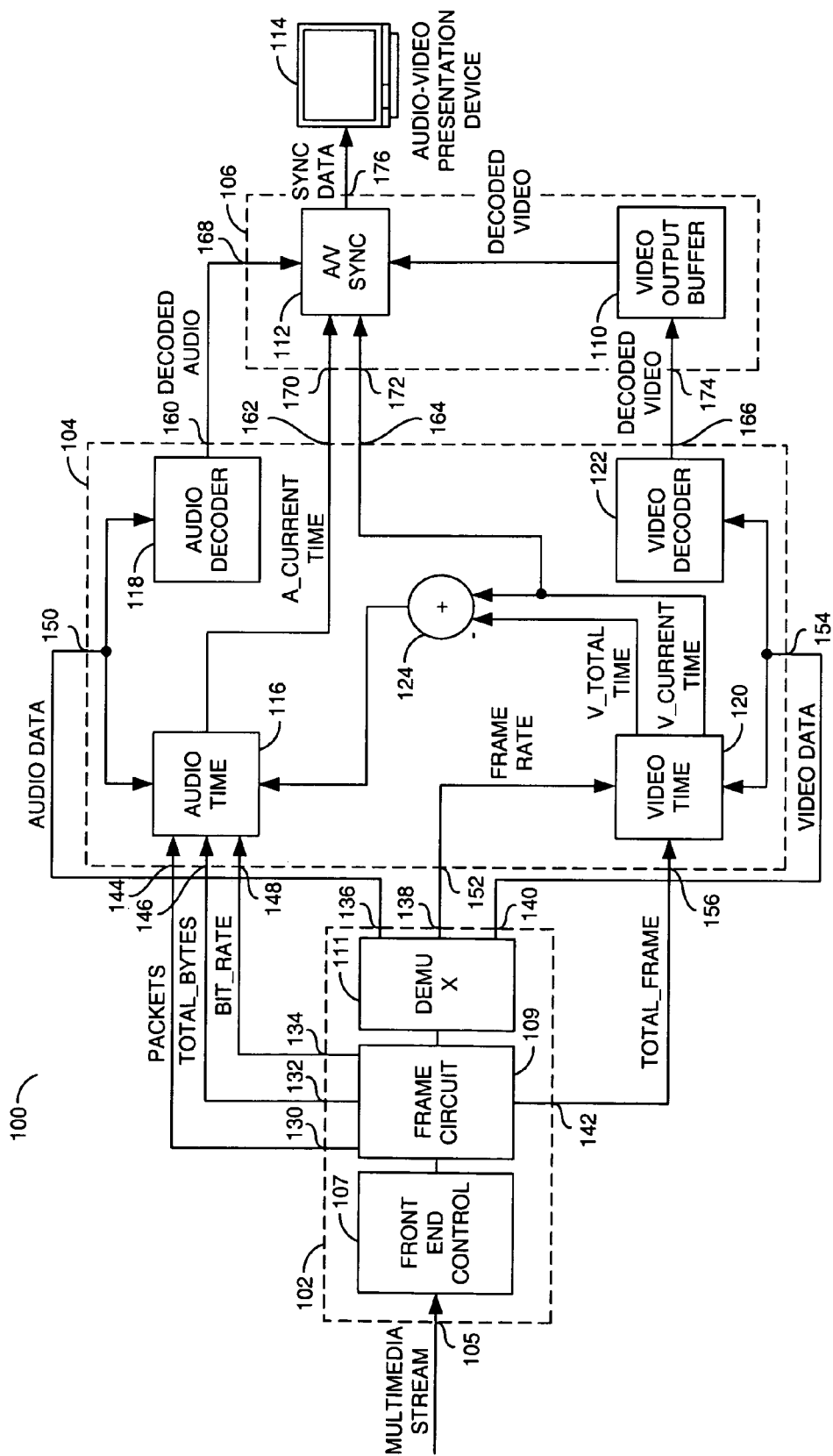
FIG. 4 is a more detailed diagram of the present invention shown in the context of an audio/video presentation system.

Referring to FIG. 4, a more detailed diagram of the system 100 is shown in the context of an audio-video presentation system. The system 100 further includes an audio-video presentation device 114. The input circuit 102 generally comprises a block (or circuit) 107, a block (or circuit) 109 and a block (or circuit) 111. The circuit 107 may be implemented as a front end controller. The circuit 109 may be implemented as a frame circuit. The circuit 111 may be implemented as a demultiplexer. The audio/video decoder 104 generally comprises a block (or circuit) 116, a block (or circuit) 118, a block (or circuit) 120, a block (or circuit) 122 and a block (or circuit) 124. The circuit 116 may be implemented as an audio time circuit. The circuit 118 may be implemented as an audio decoder. In one example, the circuit 116 and the circuit 118 may be implemented as a single combined circuit. The circuit 120 may be implemented as a video time circuit. The circuit 122 may be implemented as a video decoder. In one example, the circuit 122 and the circuit 124 may be implemented as a single combined circuit. The circuit 124 may be implemented as an adder circuit 124. The video time circuit 120 may present a signal (e.g., V_TOTAL_TIME) to the adder circuit 124. The video time circuit 120 may present the signal V_CURRENT_TIME to the adder circuit 124. The synchronization circuit 106 generally comprises a block (or circuit) 110 and a block (or circuit) 112. The circuit 110 may be implemented as a video output buffer. The circuit 112 may be implemented as an audio-video synchronization circuit.

The front end controller 107 may receive the signal MULTIMEDIA_STREAM from a multiplexer (not shown). The front end controller 107 may present the signal MULTIMEDIA_STREAM to the frame circuit 109. The frame circuit 109 may present bitrate information related to the A/V multiplex or the signal MULTIMEDIA_STREAM on the signal BIT_RATE. The frame circuit 109 may present the signal MULTIMEDIA_STREAM to the demultiplexer 111. The demultiplexer 111 may present compressed audio data on the signal AUDIO_DATA. The demultiplexer 111 may present compressed video data on the signal VIDEO_DATA. The video decoder 122 may present decoded (or uncompressed) video data on the signal DECODED_VIDEO. The audio decoder 118 may present decoded (or uncompressed) audio data on the signal DECODED_AUDIO. The audio time circuit 116 may present the current time of decoded audio data on the signal A_CURRENT_TIME. The video decoder 122 may present the current time of decoded video data on the signal V_CURRENT_TIME. The A/V synchronization circuit 112 may present synchronized audio and video data over a signal (e.g., SYNC_DATA) to the audio-video presentation device 114.

The signal MULTIMEDIA_STREAM may be comprised of multiple independent audio streams and one primary video stream. At any time, a single audio video stream may be presented to a viewer via the audio-video presentation device 114. The signal MULTIMEDIA_STREAM may maintain a time difference between audio and video streams correctly and consistently throughout the A/V multiplex file. The relationship between audio and video packets in the signal MULTIMEDIA_STREAM may remain consistent.

The video stream in the signal MULTIMEDIA_STREAM may be multiplexed at a known and constant frame-rate. A maximum time distance, ΔTimeOffset between audio and video packets may be assumed. The audio streams of the signal MULTIMEDIA_STREAM may be piecewise variable and include a constant bit-rate over the maximum time distance ΔTimeOffset. A stream may be comprised of variable-sized packets, but the overall rate of the stream can be constant over a designated period of time such as ΔTimeOffset. Hence when examined in very short pieces (such as a 2 to 3 packets), the stream may appear to be variable-rate. However, when examined over a longer duration (such as 100 packets), the stream could be constant-rate.

The system 100 may measure the relationship between audio and video frames at the beginning of the A/V multiplex file to account for anomalies. The system 100 may maintain audio-video synchronization throughout the playback of the signal MULTIMEDIA_STREAM by maintaining an offset on a periodic basis. The benefits of maintaining an offset with poorly synchronized audio and video streams on a periodic basis will be discussed in more detail in connection with FIG. 5. In one example, the signal MULTIMEDIA_STREAM may be implemented as the audio preload stream 58 as shown in connection with FIG. 2. Despite the nature of the audio or video packets at the beginning of the signal MULTIMEDIA_STREAM, if the signal MULTIMEDIA_STREAM is implemented as the audio preload stream 58, the multiplexing of the audio and video data in the signal MULTIMEDIA_STREAM may remain consistent.

The frame circuit 109 may study the relationship between the audio and video packets for a period ΔT at the beginning of the signal MULTIMEDIA_STREAM. Within the period ΔT, the frame circuit 109 may determine the total number of video frames and the total number of bytes for each audio frame. The frame circuit 109 may present the total number of video frames on the signal TOTAL_FRAME. The frame circuit 109 may present the total number of bytes for each audio frame on the signal TOTAL_BYTES. Since the video frame-rate is known, the video time circuit 120 may calculate the exact time corresponding to the video frames for the period ΔT. Since the exact time corresponding to the video frames for a duration ΔT may be known based on the implementation of the signal MULTIMEDIA_STREAM as the audio preload stream 58, the timing relationship between the audio data and video data during the time ΔT may be estimated.

The frame circuit 109 may determine the signal TOTAL_FRAMES based on the following equation EQ. 1:

$$V_{TotalFrames} = \sum_{t=0}^{\Delta T} VideoFrames \quad \text{(EQ. 1)}$$

The video time circuit 120 may determine the signal V_TOTAL_TIME based on the following equation EQ. 2:

$$V_{TotalTime} = \frac{V_{TotalFrames}}{V_{FramesPerSecond}} \quad \text{(EQ. 2)}$$

where $V_{TotalFrames}$ may be defined as the signal TOTAL_FRAME and $V_{FramesPerSecond}$ may be defined as the signal FRAME_RATE.

The frame circuit 109 may determine the signal TOTAL_BYTES based on the following equation EQ. 3:

$$A_{TotalBytes} = \sum_{t=0}^{\Delta T} AudioBytes \quad \text{(EQ. 3)}$$

The audio time circuit 116 may determine the audio total time based on the following equation EQ. 4:

$$A_{TotalTime} = \frac{A_{TotalBytes}}{A_{Bitrate}} \quad \text{(EQ. 4)}$$

where $A_{Bitrate}$ may be defined as the signal BIT_RATE.

The video time circuit 120 may determine the signal V_CURRENT_TIME based on the following equation EQ. 5:

$$V_{CurrentTime} = \frac{V_{FrameNum}}{V_{FramesPerSecond}} \quad \text{(EQ. 5)}$$

where $V_{FrameNum}$ may be defined as a video frame number and $V_{FramesPerSecond}$ may be defined as the signal FRAME_RATE.

The audio time circuit 116 may determine the signal A_CURRENT_TIME based on the following equation EQ. 6:

$$A_{CurrentTime} = V_{CurrentTime} + (A_{TotalTime} - V_{TotalTime}) \quad \text{(EQ. 6)}$$

The audio time circuit 116 may also determine the pre-load audio time based on the number of packets on the signal PACKET rather than the total number of bytes on the signal TOTAL_BYTES. The frame circuit 109 may determine the total number of audio packets by the following equation EQ. 7:

$$A_{TotalPackets} = \sum_{t=0}^{\Delta T} AudioPackets \quad \text{(EQ. 7)}$$

The audio time circuit 116 may determine an audio total time based on the following equation EQ. 8:

$$A_{TotalTime} = \frac{A_{PacketNum}}{A_{PacketsPerSecond}} \quad \text{(EQ. 8)}$$

where $A_{PacketNum}$ may be defined as a packet number for an audio packet and $A_{PacketPerSecond}$ may be defined as a packet rate.

Equation EQ. 8 may be used to determine the signal A_CURRENT_TIME with equation EQ. 6:

$$A_{CurrentTime} = V_{CurrentTime} + (A_{TotalTime} - V_{TotalTime})$$

The system 100 may provide for the robust playback of the multiplex stream 52 without embedded video/audio timestamps with the following steps.

In a first step, the demultiplexer 111 may de-multiplex the audio and video data from the multiplex A/V file (or the signal MULTIMEDIA_STREAM).

In a second step, the audio time circuit 116 may determine the value of $A_{TotalTime}$ (with equation EQ. 4 or equation EQ. 8) after a predetermined time. The video time circuit 120 may determine $V_{TotalTime}$ (or the signal V_TOTAL_TIME) with equation EQ. 2 after a predetermined time. Prior to the expiration of the predetermined time $\Delta T$, the A/V synchronization circuit 112 may use the signal V_CURRENT_TIME to synchronize decoded audio data and decoded video signal until the audio time circuit 116 has determined the value of $A_{TotalTime}$. The audio time circuit 116 may use the decoded samples (e.g., the total decoded signal between decoded audio and video data) to determine the signal A_CURRENT_TIME. For example, the audio time circuit 116 may determine the signal A_CURRENT_TIME based on the following equation EQ. 9:

$$A_{CurrentTime} = \frac{TOTALDECODEDSAMPLES}{SamplesPerSecond} \quad \text{(EQ. 9)}$$

In a third step, after the predetermined time $\Delta T$ has expired, the A/V synchronization circuit 112 may use the signals V_CURRENT_TIME and A_CURRENT_TIME for synchronizing the decoded video data and the decoded audio data as described in equations EQ. 1 through EQ. 8. The A/V synchronization circuit 112 may present the corresponding decoded audio and decoded video data over the signal SYNC_DATA in accordance with the relevant decoded video data and decoded audio data. The A/V synchronization circuit 112 may employ proprietary techniques to guarantee the proper synchronization of decoded video data and decoded audio data. The A/V synchronization circuit 112 may (i) optimally receive periodic values from the signal V_CURRENT_TIME and the signal A_CURRENT_TIME and (iii) employ the periodic values for the purposes of A/V synchronization. The periodic values from the signals V_CURRENT_TIME and A_CURRENT_TIME may commence from (i) the beginning of the presentation or (ii) points where the presentation has re-started from an offset within the signal MULTIMEDIA_STREAM. The frequency of the signals V_CURRENT_TIME and A_CURRENT_TIME may vary from being sent only once during the entire presentation or sent prior to each and every video and audio packet.

When the signal MULTIMEDIA_STREAM includes more than one audio stream the signal A_CURRENT_TIME may be independently calculated and for each audio stream based on the question EQ. 10:

$$A_{CurrentTime}(i) = V_{CurrentTime} + (A_{TotalTime}(i) - V_{TotalTime}) \quad \text{(EQ. 10)}$$

The calculation of an independent signal A_CURRENT_TIME for each audio stream may enable seam-less switching of video and audio data during the presentation (or playback) of multimedia streams with multiple audio streams.

Figure 5:
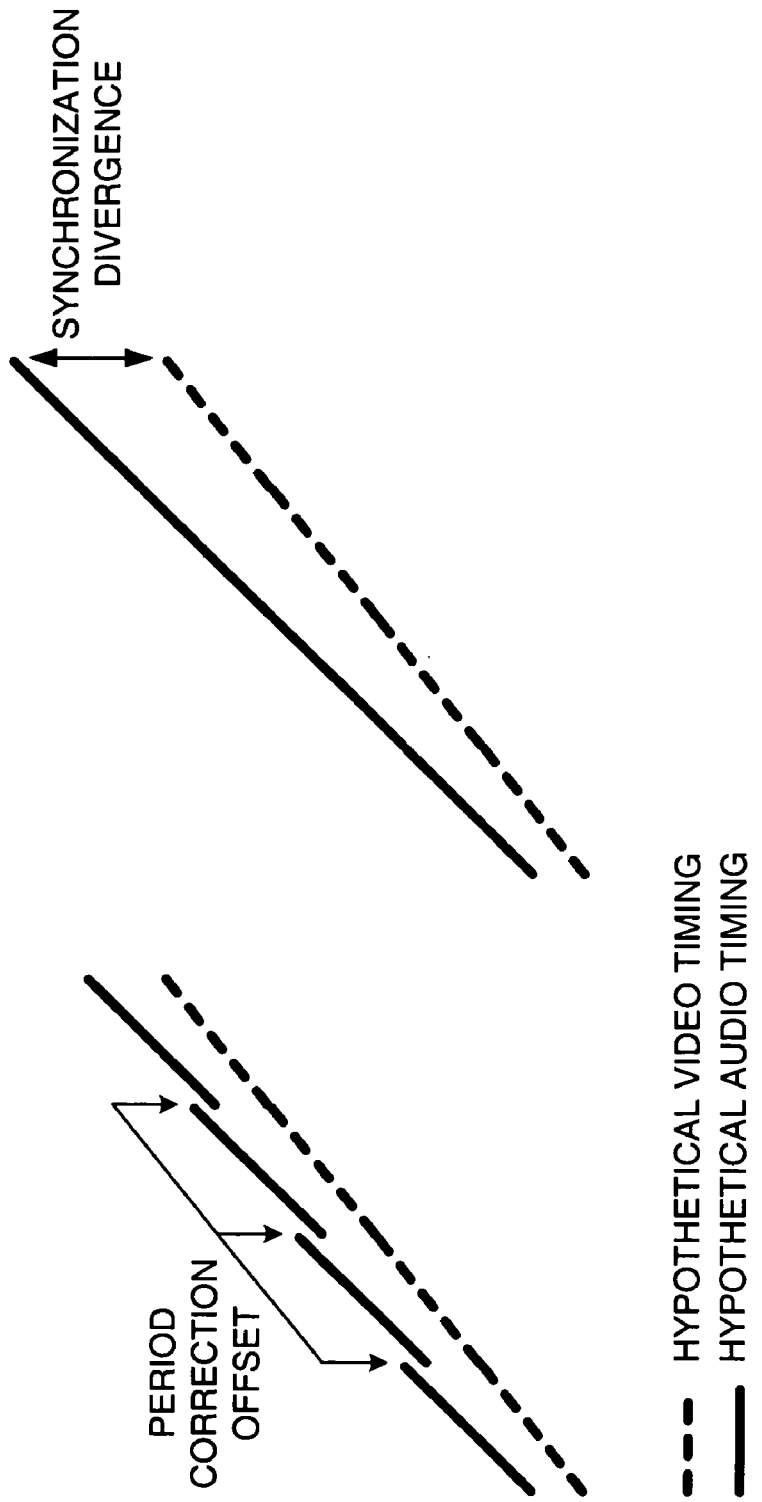
FIG. 5 is a diagram illustrating the benefits of using a periodic correction offset in the case of poorly synchronized streams.

Referring to FIG. 5, a diagram illustrating the benefits of using a periodic correction offset is shown. In general, the system 100 may maintain audio-video synchronization throughout the playback of the signal MULTIMEDIA_STREAM by maintaining an offset on a periodic basis. Such an offset may be used to achieve audio-video synchronization in streams with poorly synchronized audio and video streams. The periodic correction offset may prevent drift between video timing and audio timing during the playback of the signal MULTIMEDIA_STREAM.

While the invention has been particularly shown and described with reference to the preferred embodiments thereof, it will be understood by those skilled in the art that various changes in form and details may be made without departing from the scope of the invention.

The invention claimed is:

1. An apparatus comprising:
 a first circuit configured to (i) demultiplex a multimedia stream having one or more video and audio streams and (ii) generate one or more video data signals and one or more audio data signals in response to demultiplexing said multimedia stream, wherein said multimedia stream is independent of embedded time stamps;
 a second circuit configured to (i) decode said one or more video data signals and said one or more audio data signals and (ii) generate a video current time signal for each decoded video signal and an audio current time signal for each decoded audio signal, wherein said second circuit is configured to generate said audio current time signal based on a total time for each decoded audio signal, said video current time signal, and said video total time for each decoded video signal; and
 a third circuit configured to synchronize the playback of each decoded audio signal and each decoded video signal with said audio current time signal and said video current time signal.

2. The apparatus according to claim 1, wherein said second circuit comprises a video time circuit configured to determine said video current time signal based on a video frame rate and the number of frames for each decoded video signal.

3. The apparatus according to claim 2, wherein said second circuit comprises an audio time circuit configured to determine a video total time for each decoded video signal based on the total number of frames and said frame rate.

4. The apparatus according to claim 1, wherein said total time for each decoded audio signal is based on a total number of bytes and a bitrate of said decoded audio signal.

5. The apparatus according to claim 1, wherein said total time for each decoded audio signal is based on a number of packets and a number of packets per second in each decoded audio signal.

6. The apparatus according to claim 1, wherein said third circuit comprises an audio/video synchronization circuit configured to synchronize each decoded audio signal and each decoded video signal with said video current time signal for a predetermined amount of time while said second circuit generates said audio current time signal.

7. An apparatus comprising:
  means for (i) demultiplexing a multimedia stream having one or more video and audio streams, wherein said multimedia stream is independent of embedded time stamps and (ii) generating one or more video data signals and one or more audio data signals in response to demultiplexing said multimedia stream wherein said multimedia stream is independent of embedded time stamps;
  means for (i) decoding said one or more video data signals and one or more audio data signals, (ii) generating a video current time signal for each decoded video signal and an audio current time signal for each decoded audio signal, and (iii) generating said audio current time signal based on (a) a total time for each decoded audio signal, (b) said video current time signal, and (c) said video total time for each decoded video signal; and
  means for synchronizing the playback of each decoded audio signal and each decoded video signal with said video current time signal and said audio current time signal.

8. A method for audio-video synchronization of a multimedia stream, comprising the steps of:
  (A) demultiplexing said multimedia stream of data having one or more video and audio streams, wherein said multimedia stream is independent of embedded time stamps;
  (B) generating one or more video data signals and one or more audio data signals in response to performing step (A);
  (C) decoding said one or more video data signals and said one or more audio data signals;
  (D) generating a video current time signal for each decoded video signal and an audio current time signal for each decoded audio signal;
  (E) synchronizing the playback of each decoded audio signal and each video signal with said video current time signal and said audio current time signal; and
  (F) generating said audio current time signal with a total time for each decoded audio signal, said video current time signal and said video total time.

9. The method according to claim 8, wherein step (C) further comprises the step of:
  generating said video current time signal with a video frame rate and the number of frames for each decoded video signal.

10. The method according to claim 9, further comprising the step of:
  determining a video total time for each decoded video signal based on the total number of frames and said frame rate of each decoded video signal.

11. The method according to claim 10, further comprising the step of:
  generating said audio current time signal based on a number of packets and the number of packets per second on each decoded audio signal.

12. The method according to claim 10, further comprising the step of:
  determining a video total time for each decoded video signal and an audio total time for each decoded audio signal after a predetermined amount of time.

13. The method according to claim 8, wherein step (D) further comprises the step of:
  synchronizing each decoded audio signal and each decoded video signal with said video current time signal for a predetermined amount of time while simultaneously generating said audio current time signal.

14. The method according to claim 8, wherein step (A) further comprises the step of:
  correctly maintaining the amount of time-difference between said video streams and said audio streams throughout an audio/video multiplex file.

15. The method according to claim 8, wherein step (A) further comprises the step of:
  maintaining a consistent relationship between audio packets in said audio stream and video packets in said video stream.

16. The method according to claim 15, further comprising the step of:
  maintaining a maximum distance between said audio packets and said video packets.

17. The method according to claim 8, further comprising the step of:
  multiplexing said multimedia stream at a known and constant frame-rate.

18. The method according to claim 8, wherein step (A) further comprises the step of:
  defining said audio stream as piecewise variable and as having a constant bit-rate over a maximum distance.

\* \* \* \* \*